(12) United States Patent
Connors

(10) Patent No.: US 7,074,305 B2
(45) Date of Patent: Jul. 11, 2006

(54) PIPELINE SUPPORT

(75) Inventor: Geoff Weyman Connors, 26 Havenwood Way, London, Ontario (CA) N6h 5B8

(73) Assignee: Geoff Weyman Connors, London (CA)

( * ) Notice: Subject to any disclaimer, the term of this patent is extended or adjusted under 35 U.S.C. 154(b) by 418 days.

(21) Appl. No.: 10/435,476

(22) Filed: May 12, 2003

(65) Prior Publication Data
US 2003/0218103 A1 Nov. 27, 2003

Related U.S. Application Data

(60) Provisional application No. 60/379,112, filed on May 10, 2002.

(51) Int. Cl.
*C23F 13/06* (2006.01)
(52) U.S. Cl. .......................... 204/196.33; 204/196.36; 204/196.37; 204/196.2; 204/196.21; 405/170; 405/179; 405/184.4; 405/211; 405/211.1

(58) Field of Classification Search ........... 204/196.21, 204/196.36, 196.33, 196.2, 196.37; 405/170, 405/179, 184.4, 211, 211.1
See application file for complete search history.

(56) References Cited

U.S. PATENT DOCUMENTS

| 4,197,033 A | * | 4/1980 | Gendron | 405/170 |
| 5,316,149 A | * | 5/1994 | Tate | 206/584 |
| 6,619,884 B1 | * | 9/2003 | Davis et al. | 405/111 |

* cited by examiner

*Primary Examiner*—Bruce F. Bell
(74) *Attorney, Agent, or Firm*—Jeffrey W. Wong; Borden Ladner Gervais LLP

(57) ABSTRACT

The present invention is directed at a pipeline support for reducing corrosion on a pipeline surface comprising support fill material, a case for housing the support fill material; wherein when a cathodic protective current contacts the support, the current flows through the support to the pipeline surface to reduce corrosion on the surface.

9 Claims, 4 Drawing Sheets

PIPELINE SUPPORT

This application claims the benefit of Provisional Application No. 60/379,112, filed May 10, 2002.

FIELD OF THE INVENTION

The present invention relates in general to pipeline supports and more specifically to an improved pipeline support which assists in reducing corrosion in pipelines.

BACKGROUND OF THE INVENTION

Corrosion of underground water, oil and gas metal pipelines is a serious problem requiring substantial expenditures for protection systems, maintenance and replacement. Dependent upon the pipeline metal and the physical and chemical composition of the soil in which the pipes within the pipeline are located, such corrosion is frequently ascribed to galvanic action in which corrosion current flows from anodic areas on the pipeline through the surrounding soil, which acts as an electrolyte, to cathodic areas on the pipeline. Generally, where the current leaves the anodic areas, corrosion of the pipeline occurs.

In many cases, the exterior of the pipelines are coated with a suitable non-metallic protective coating of an electrically insulating material. The coating isolates the metal of the pipeline from the surrounding electrolyte (i.e. the soil), thereby interposing a high electrical resistance in the anodic-cathodic circuit so that no significant corrosion current flows from the anodic areas to the cathodic areas of the pipeline.

Another prior art corrosion control attempt which is generally used in combination with the pipeline exterior coating is external cathodic protection. In this attempt, direct current is introduced into the soil surrounding the pipeline to oppose the discharge of the corrosion current from anodic areas of the pipeline, whereby the entire exposed exterior surface of the pipeline becomes a single cathodic area.

The required current is provided by impressing a voltage from an outside electrical power system on a circuit between the pipeline and a ground bed in the soil comprising buried electrodes of graphite, carbon, non-corrodable alloys, platinum or the like. Alternatively, the current may be generated by means of galvanic anodes of a less noble or electronegative metal, (e.g. zinc, aluminum or magnesium) buried in the soil and electrically connected to the ferrous metal pipeline which then becomes the cathode of the galvanic couple. In this attempt, the galvanic anode corrodes as current is discharged to the pipeline This method is normally used where only a relatively small current is required for protection.

Although under some conditions external cathodic protection may be employed successfully with a bare or uncoated pipeline, corrosion protection is generally realized by the combined use of the coating system and the cathodic protection system. In such cases, external cathodic protection system serve to protect the exposed steel at a small number of unavoidable defects or holidays in the coating.

A further aspect of a corrosion protection system is a pipeline support. Terrestrial pipeline emplacements in rocky or stony areas are protected by the addition of sand as an initial backfill in and around the pipeline. The introduction of the layer of sand or other suitably granular material, helps to protect the pipeline coating from stone or rock damage while the pipeline trench is backfilled with the excavated, stony material. A layer of sand padding can either be placed into the trench prior to pipeline placement to protect the pipeline from the stony trench bottom or, as is commonly the case, some other form of pipeline support is placed in the trench prior to pipeline placement. In this way the pipeline is safely held off the trench bottom and the sand backfill flows down around the pipeline easily when dumped in. Typically, high density foam cushions are being used for this pipeline support. However, it is known that where a foam support contacts the pipeline surface, the anode to cathode circuit can be compromised and any adjacent holidays in the pipeline coating become likely sites for corrosion damage.

Therefore, there is provided an improved pipeline support which overcomes problems in the prior art.

SUMMARY OF THE INVENTION

The present invention is directed to a pipeline support which assists in reducing corrosion in pipelines. The pipeline support of the present invention reduce the risk of contributing to coating damage and subsequent "holiday" corrosion in cathodically protected terrestrial pipeline installations. It will be understood by one skilled in the art that the term "holiday" refers to an inconsistency within the coating of a surface.

In accordance with the present invention, there is provided a pipeline support comprising a porous material (woven or non-woven) adapted to contain a porous, light and possibly water absorbing material, which support is thereby adapted to maintain trench bottom clearance while allowing the cathodic to anode protective current an unrestricted path thereby maintaining the integrity of the cathodic protection system. Fill materials suitable in the practice of the present invention include pearlite, vermiculite, or porous stone or manmade materials such as plastic or foam-type pellets. Suitable fabric for the support casing include loosely woven, non coated or needle punched polypropylene or like materials.

In an aspect of the present invention, there is provided a pipeline support for reducing corrosion on a pipeline surface comprising support fill material, a case for housing the support fill material; wherein when a cathodic protective current contacts the support, the current flows through the support to the pipeline surface to reduce corrosion on the surface.

In another aspect of the present invention, there is provided a pipeline support comprising a sheet of fabric lain to include an overlap, the overlap being partially sewn to expose a gap, and edges of the sheet of fabric being sewn shut; support fill material; wherein the support is filled by the support fill material via the gap.

In yet a further embodiment, there is provided a pipeline corrosion reducing system comprising a set of pipeline supports for supporting a pipeline, each of the pipeline supports comprising: support fill material; and a casing for housing the support fill material wherein the pipeline supports are placed in predetermined locations along the pipeline; and wherein when a cathodic protective current contacts one of the set of pipeline supports, the current flows through the support to a surface of the pipeline to reduce corrosion on the surface.

BRIEF DESCRIPTION OF THE DETAILED DRAWINGS

Embodiments of the present invention will be described more fully with reference to the accompanying drawings in which.

DESCRIPTION OF THE PREFERRED EMBODIMENTS

Figure 2:
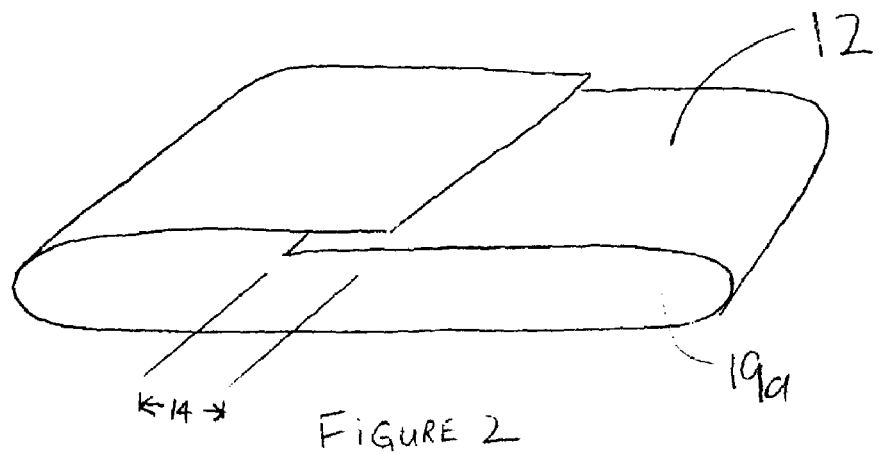
FIG. 2 is a perspective view of an outer layer of the pipeline support.
Figure 1:
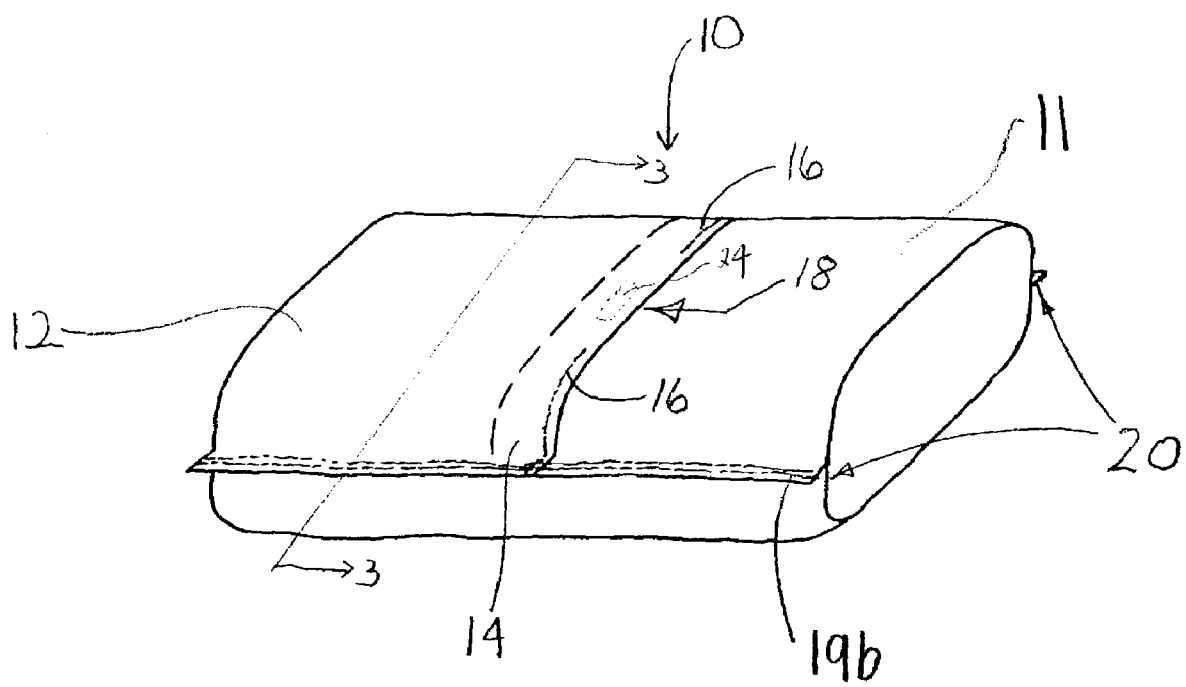
FIG. 1 is a perspective view of a first embodiment of a pipeline support in accordance with the present invention.

Turning to FIG. 1, a first embodiment of a pipeline support is shown and designated as 10. The pipeline support 10 is preferably comprises a casing 11 manufactured using a sheet of fabric 12 which is folded over in such a manner as to allow for an overlap 14 of approximately 4"–6", as shown in FIG. 2. Edges 16 of the overlap 14 are then partially sewn leaving a small gap 18 of approximately 2"–4" in the center of the overlap 14. It will be understood that the sizes disclosed for the overlap 14 and the edges 16 are simply preferred values and are not intended to be restrictive values. After the fabric 12 is folded over, the open sides 19a (FIG. 2) on either side of the fabric 12 are then completely sewn or heat welded shut to close off the support 10 so that there are no openings in the support 10 except for the gap 18. It will be understood that other methods of closing the open sides 19a are possible. As can be seen in FIG. 1, the closed sides 19b are shut so that preferably no fill material may leave the pipeline support once it has been filled. In the preferred embodiment, fill material is then inserted into the support 10 via the gap 18. Preferably the fill material is inserted via a small diametered (fitting the gap) tube. The fill material may then be manually inserted or even blown in by machinery.

Figure 3:
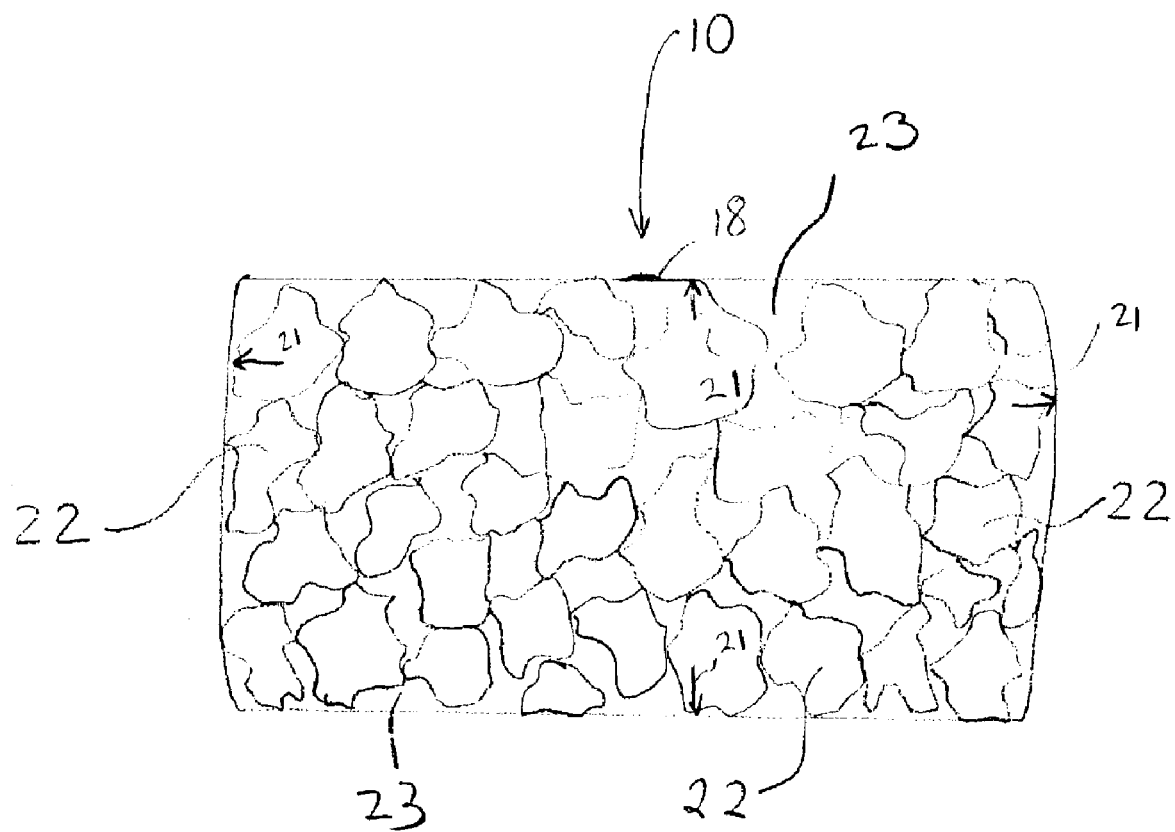
FIG. 3 is a cross-section view taken along the line 3—3 of FIG. 2.

As shown in FIG. 3, once filling of the pipeline support is completed, the internal force, designated by arrow 21 of the fill material 22 against the interior of the support 10 closes off the gap 18. The pipeline support 10 may also include closing means 24, such as a Velcro closure, to assist in sealing the gap 18 once the fill material 22 has been inserted. It will be understood that the shape of the fill material is shown as crumbs but may be spherical as well. Furthermore, the fill material 22 is not tightly packed such that spaces 23 exist in between separate pieces of the fill material, however, when the pipeline is placed on top of the support, the fill material pack closer together to provide the necessary support between the pipeline and the ground while maintaining space between the fill material so that groundwater and cathodic protective current may flow within the support 10.

In order to maintain corrosion protection at the interface between the surface of the pipeline and the pipeline support 10 of the present invention, the fill material 22 is selected such that it has a porous characteristic allowing for the free flow of groundwater and cathodic protective current to the exterior surface of the pipeline. This will be more clearly described with respect to FIG. 5. Suitable fill materials include, but are not restricted to, a combination of pearlite, vermiculite and porous stone or manmade materials such as plastic or foam-type pellets. The use of the above-identified fill materials allows for a light weight support which, after absorption of groundwater, becomes heavier such that the support 10 will maintain it's position underneath the pipeline. Unlike the high density foam pipeline supports used in the prior art, there exists spaces between the individual pieces of fill material so that the cathodic protective current is conducted within the support so that the anodic current may flow from the pipeline to the soil rather than staying on the exterior of the pipeline causing corrosion.

Figure 4:
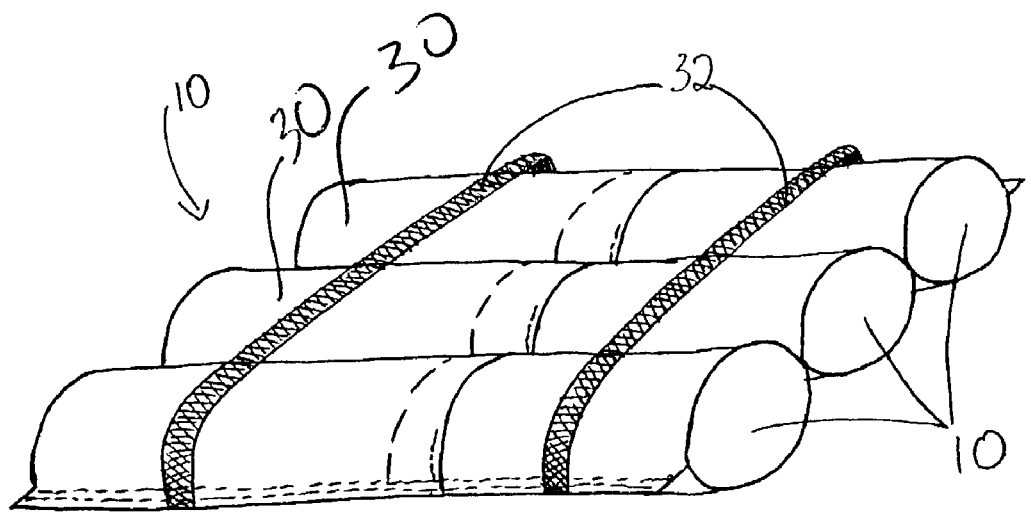
FIG. 4 is a perspective view of a second embodiment of a pipeline support.

Turning to FIG. 4, multiple tubes may be employed as shown and designated as 30. The set of multiple tubes 30 allow for a larger support to be created while maintaining a low profile (6"–12"). In the preferred embodiment, the casing housing the fill material is made from a single piece of fabric but divided into three separate tubes. It will be understood that the multiple tubes 30 may also be separate supports combined to create a single larger support. A strap or straps are used to ensure the multiple tubes 30 are mobilized to protect the lower surface of the pipe. Therefore, rather than having a pipeline simply resting atop the support 10, the multiple tubes are flexible enough to be shaped around the outside of the bottom of the pipeline.

Figure 5:
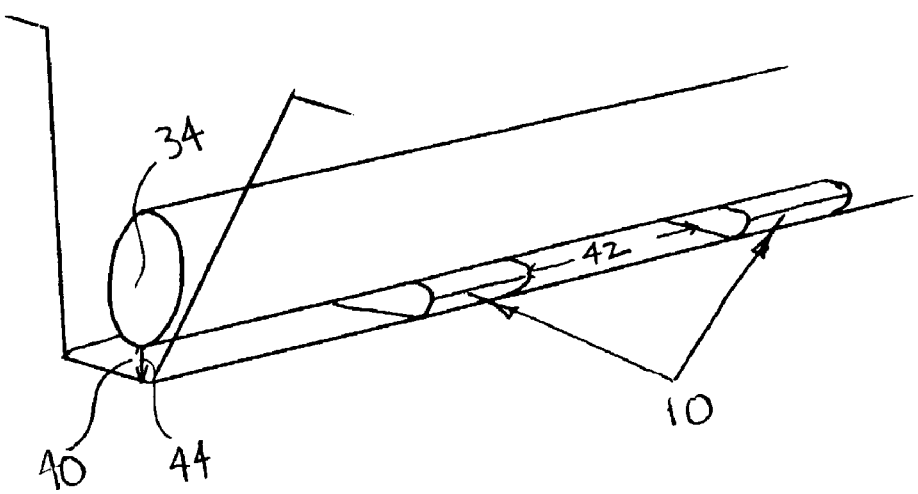
FIG. 5 is a schematic diagram of a section of pipeline supported by pipeline supports.

Turning to FIG. 5, a schematic diagram of a pipeline 34 resting on pipeline supports is shown. The pipeline supports 10 are installed into a trench 40 at regular intervals 42 to provide a clearance 44 between the pipeline and the trench bottom 40 especially in trenches which are filled with rock or stone.

In most installations, the pipeline supports 10 of a pipeline corrosion reducing system are laid down into the trench 40 at the regular intervals 42 which are predetermined by the installer. After the pipeline supports are laid down, the pipeline 34 is then rested on top of the pipeline supports 10. The trench 40 may then be backfilled with a sand or comparable material which fills the clearances 44 within the regular intervals 42. The sand backfill typically continues to a suitable distance above the pipeline after which the in-situ material is returned to the trench 40. The porous nature of the fabric and fill material allows both the groundwater and the cathodic protection current to flow through the sand and the support to the pipeline surface should any defect in the pipeline coating be present.

Alternatively, for larger sized pipeline supports, multiple chambers or compartments may be used so that the thickness and corresponding weight of the pipeline support remains manageable such that is may be installed by one of two individuals.

Figure 6:
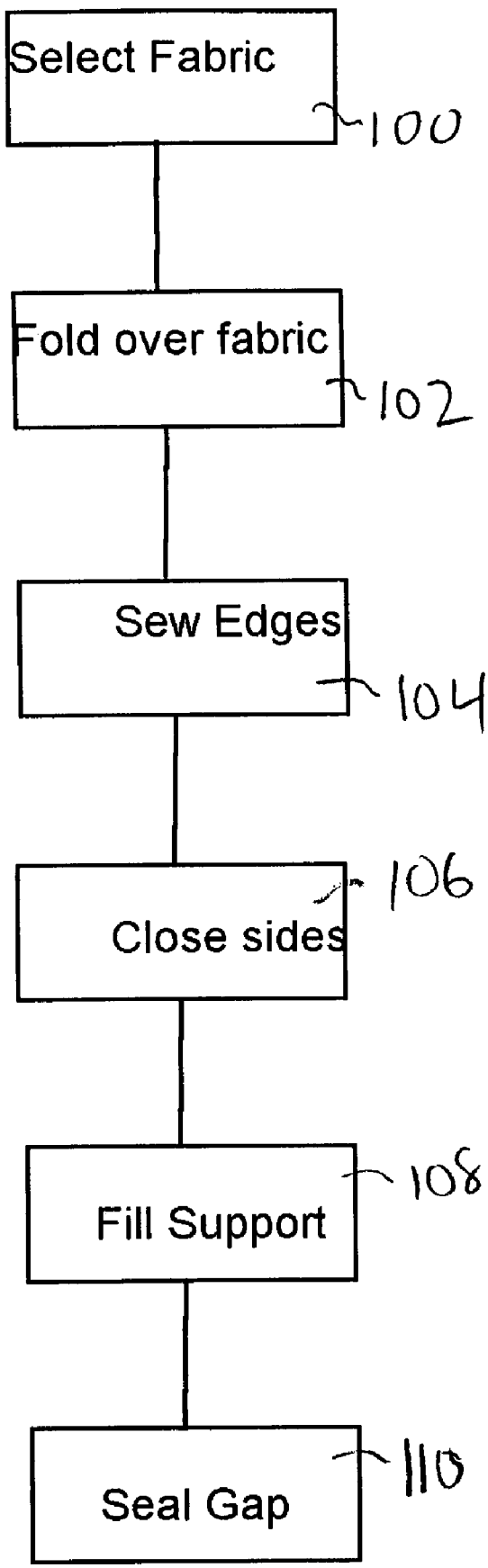
FIG. 6 is a flow diagram outlining a method of making a pipeline support.

Turning to FIG. 6, a method of manufacturing a pipeline support 10 is shown. After selecting a piece of fabric to be used as an outer cover (step 100), the manufacturer folds the fabric 12 over such that an overlap of approximately 4"–6" is left (step 102). Edges of the overlap are then sewn (step 104) leaving a gap of approximately 2"–4" in the middle of the overlap. The open sides of the fabric are then closed preferably by being sewn shut or by heat welded (step 106). The pipeline support is then filled with a selected fill material through the gap (step 108). The fabric and the fill material is preferably a porous material which allows both groundwater and cathodic protection current to flow to any bare potion of the pipeline thereby opposing the discharge of corrosive current from the bare portion to reduce the chance of corrosion on the exterior of the pipeline. After the filling material has been inserted into the pipeline support, the gap is sealed (step 110).

Alternatively, the casing design may be an open sack which is then closed once the casing is filled with the fill material.

Although preferred embodiments of the invention have been described herein in detail, it will be understood by those skilled in the art that variations may be made thereto without departing from the scope of the invention, which is defined solely by the claims appended hereto.

The invention claimed is:

1. A pipeline support for reducing corrosion on a surface of a pipeline when supporting said pipeline comprising:
   porous support fill material; and
   a case for housing said porous fill material;
   said porous support fill material and said case for receiving a cathodic protective current and for causing said cathodic protective current to flow through said support to said surface of said pipeline to reduce corrosion on said surface.

2. The pipeline support of claim 1 wherein said support fill material comprises at least one of pearlite, vermiculite, porous stone, foam pellets and plastic pellets.

3. The pipeline support of claim 1 wherein said casing is manufactured from a porous material.

4. The pipeline support of claim 3 wherein said porous material is one of loosely woven non-coated polypropylene or needle-punched polypropylene.

5. A pipeline corrosion reducing system comprising:
   a set of pipeline supports for supporting a pipeline, wherein said pipeline supports are placed in contact underneath said pipeline at predetermined locations; each of said pipeline supports comprising:
   porous support fill material; and
   a porous casing for housing said porous support fill material;
   said porous support fill material and said case for receiving a cathodic protective current and for causing said cathodic protective current to flow through said support to a surface of said pipeline to reduce corrosion on said surface of said pipeline.

6. A pipeline support comprising;
   porous support fill material: and
   a single sheet of fabric, said single sheet being folded over to include an overlap and having its edges thereby attached to form a casing; said overlap also being partially sewn to expose an opening for receiving said support fill material;
   wherein when said pipeline support is installed under a pipeline, said porous support fill material allowing for a cathodic protective current to flowthrough thereby reducing corrosion on a surface of said pipeline.

7. The pipeline support of claim 6 further comprising closing means to close said opening after said pipeline support has been filled.

8. The pipeline support of claim 6 further comprising:
   at least two filled casings; and
   a set of straps for tying said at least two filled casings together to allow said pipeline support to be lifted.

9. The pipeline support of claim 6 further comprising:
   a set of straps mounted around said casing to allow said pipeline support to be lifted.

* * * * *